Dec. 27, 1966  H. O. CORBETT  3,293,690
INFLATED EDGE BEAD FOR THERMOPLASTIC FILMS AND APPARATUS
FOR THE PRODUCTION THEREOF
Filed June 28, 1965  3 Sheets-Sheet 1
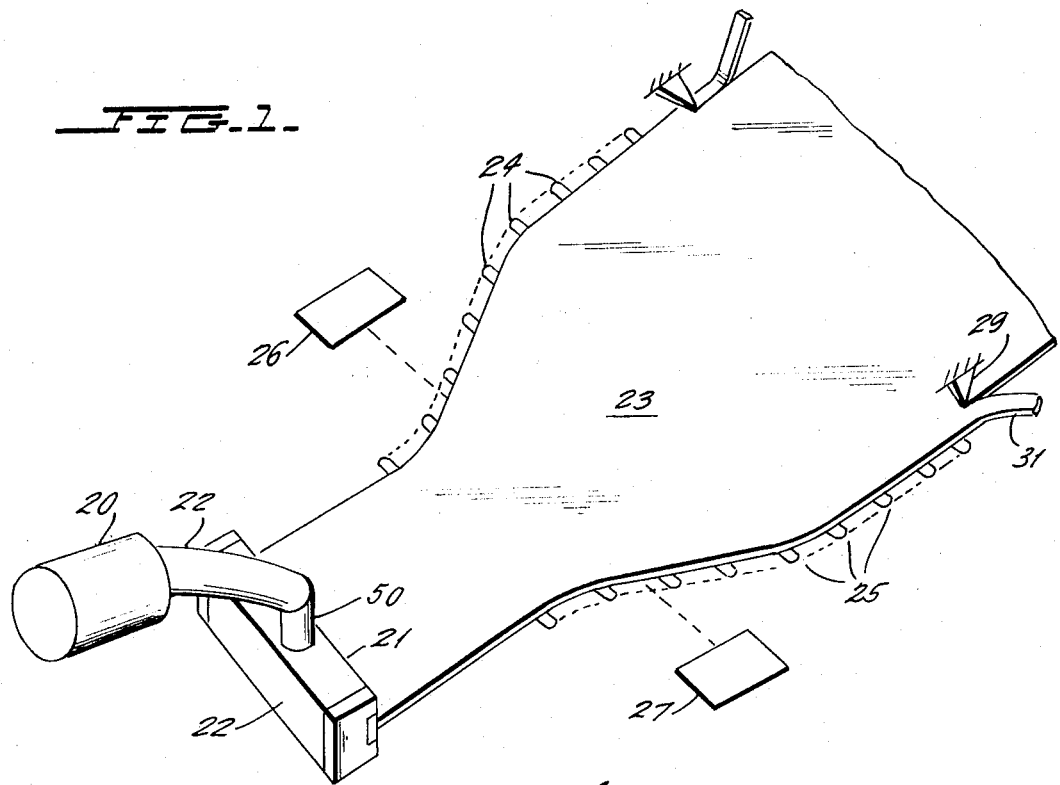
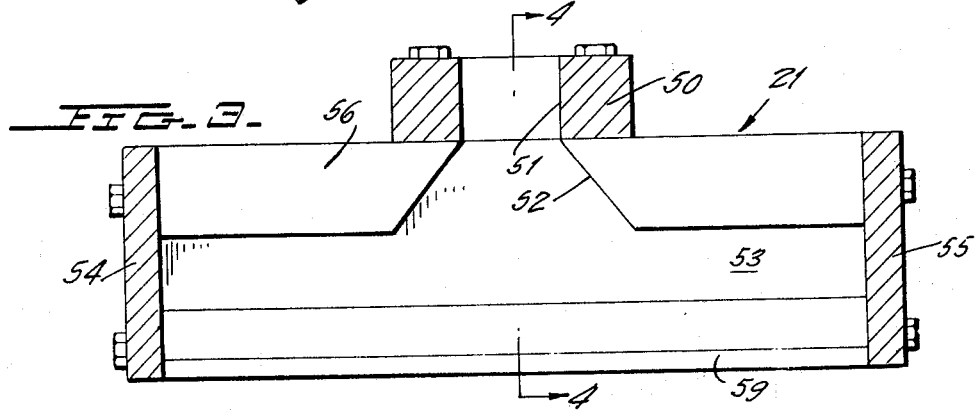
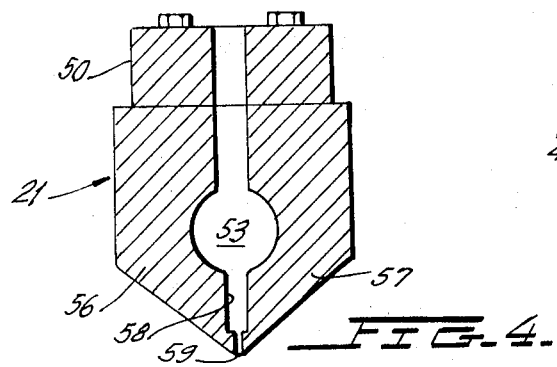
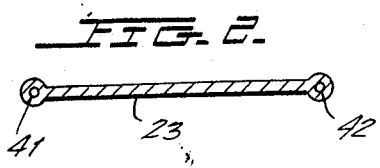
INVENTOR.
HERBERT O. CORBETT
BY Dec. 27, 1966 H. O. CORBETT 3,293,690
INFLATED EDGE BEAD FOR THERMOPLASTIC FILMS AND APPARATUS
FOR THE PRODUCTION THEREOF
Filed June 28, 1965 3 Sheets-Sheet 2
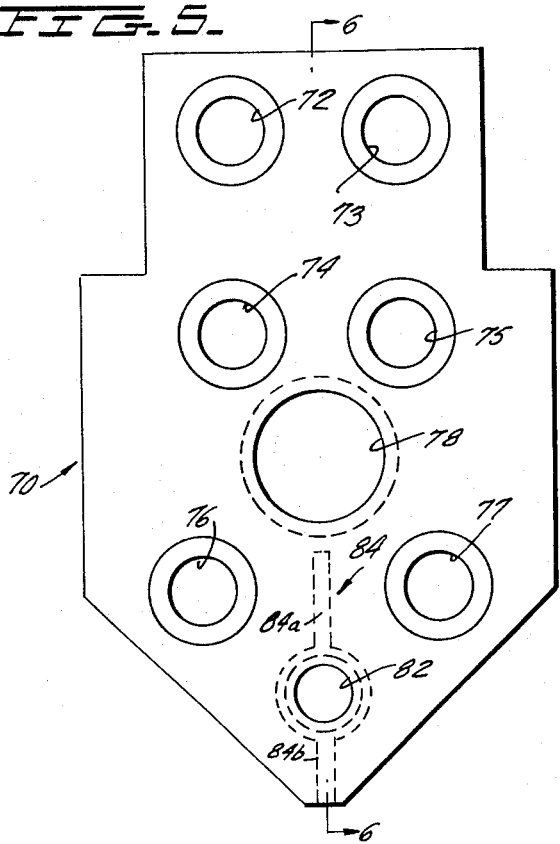
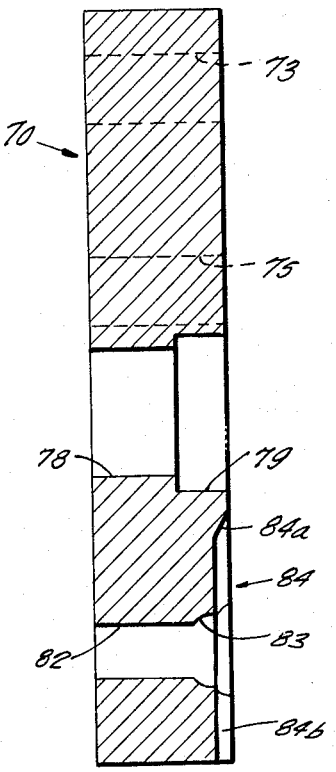
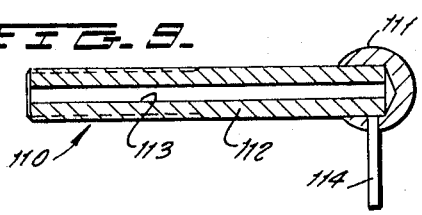
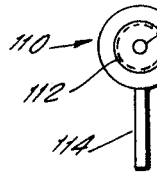
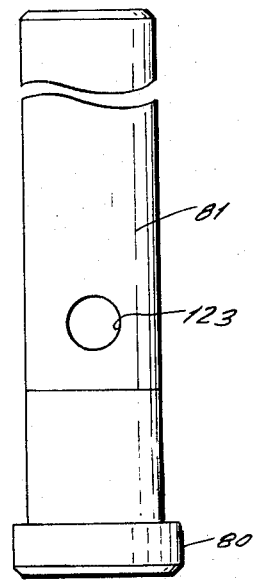
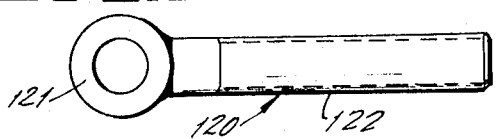
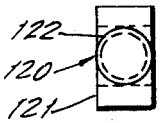
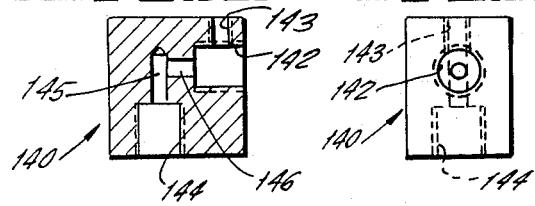
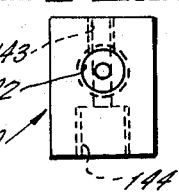

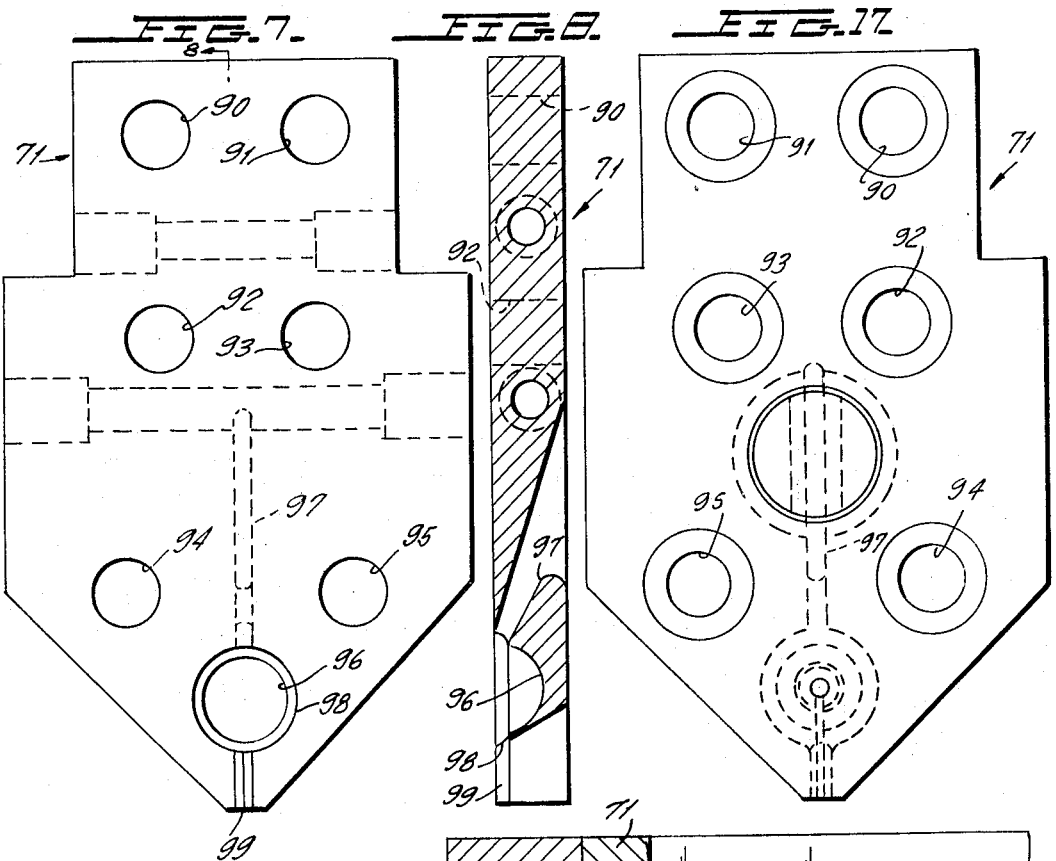
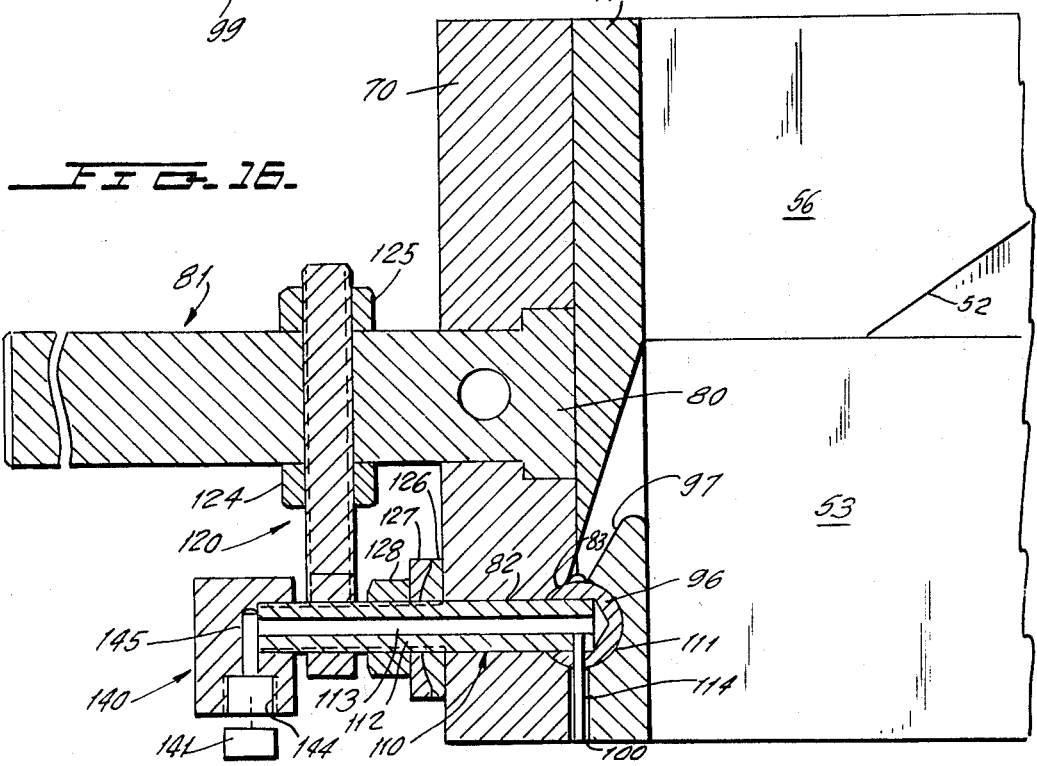

United States Patent Office 3,293,690
Patented Dec. 27, 1966

3,293,690
INFLATED EDGE BEAD FOR THERMOPLASTIC FILMS AND APPARATUS FOR THE PRODUCTION THEREOF
Herbert O. Corbett, Bridgeport, Conn., assignor to National Distillers and Chemical Corporation, New York, N.Y., a corporation of Virginia
Filed June 28, 1965, Ser. No. 467,608
3 Claims. (Cl. 18—12)

This invention relates to a novel method and apparatus for controlling the shape of the edges of extruded flat film so that the edges are round and hollow in cross-section.

In the manufacture of flat thermoplastic film, it is standard practice to grip the edges of the film leaving the extruder so that the film can be subsequently axially moved and transversely stretched by the means gripping the opposite edges of the film. Apparatus of this type is well known, and is shown, for example, in copending application Serial No. 352,841, in the name of H. O. Corbett et al. filed March 18, 1964, entitled "Thermoplastic Articles, Apparatus and Process for Their Manufacture," and assigned to the assignee of the present invention.

In accordance with the present invention, an inflated bead is provided along the edge of the extruded web of material, thereby providing control of the heat exchange pattern between the hot film and the tenter frame clips which grip the film edges. In addition, by inflating the edges of the film, the grip between the tenter clips and the web is improved.

Moreover, and during the extrusion of the film, the inflated edges improve the extrusion process in that they aid in controlling the pressure drop across the discharge orifice of the die by removing mass from the center thereof. That is to say, by controlling the diameter of the inflated edges of the film, the velocity of the melt flow can be controlled to cause the film edges to move at the same speed as the center of the film.

In accordance with the invention, an inflated bead is placed in the sides of the film through the provision of a novel hollow ball and socket coring pin which has an air passage therethrough to introduce air into the edges of the film, thereby inflating a small tube at the edges of the film.

The novel coring pin is then nested in a socket in the end plate at each end of the extrusion die. The molten polymer will then flow around and over this pin such that when the polymer solidifies, the cross-section of the film or web will resemble a double ended "welting." That is to say, the film will have a small hollow cylindrical bead along its length at either edge thereof.

Accordingly, a primary object of this invention is to form a hollow inflated bead along either edge of a extruded sheet of thermoplastic material.

Another object of this invention is to provide means for improving the heat exchange between the gripped edges of a film and the tenter frame clips which grip the edges.

Yet another object of this invention is to provide inflated edges for an extruded film to permit the improved gripping of the film edges by tenter frame clips.

A still further object of this invention is to provide an adjustably inflated edge bead on either side of an extruded film to control the pressure drop across the full length of the discharge orifice.

These and other objects of this invention will become apparent from the following description when taken in connection with the drawings, in which:

FIGURE 1 is a perspective diagram schematically illustrating an extrusion system and tenter frame clip system for axially moving and transversely stretching the extruded film.

FIGURE 2 illustrates the film being extruded in FIGURE 1 with the edges thereof being provided with an inflated bead in accordance with the invention.

FIGURE 3 is a cross-sectional view of a prior art type of extrusion die which is to be modified in accordance with the invention.

FIGURE 4 is a cross-sectional view of FIGURE 3 taken across the line 4—4 in FIGURE 3.

FIGURE 5 is a front view of a die cap used in accordance with the invention for modifying the die of FIGURES 3 and 4 for the production of the inflated edge beads.

FIGURE 6 is a cross-sectional view of FIGURE 5 taken across the line 6—6 in FIGURE 5.

FIGURE 7 is a plan view of the edge bead inner cap which is interposed between the standard die with the die cap of FIGURES 5 and 6 in accordance with the invention.

FIGURE 8 is a cross-sectional view of FIGURE 7 taken across the line 8—8 in FIGURE 7.

FIGURE 9 is a cross-sectional view of the edge bead-forming tube or coring pin of the present invention.

FIGURE 10 is an end view of FIGURE 9.

FIGURE 11 is a side view of the adjusting bolt used with the bead-forming tube of FIGURES 9 and 10.

FIGURE 12 is an end view of FIGURE 11.

FIGURE 13 is a cross-sectional view of the air pressure nut connected to the edge bead-forming tube in accordance with the invention.

FIGURE 14 is an end view of FIGURE 13.

FIGURE 15 is a plan view of the guide rod used to support the forming tube of the invention.

FIGURE 16 is a cross-sectional view of the assembly of the components shown in FIGURES 5 through 15 for one side of the extrusion die to form a bead in one side of the extruded film.

FIGURE 17 is a side view taken from the left-hand side of FIGURE 16.

Referring first to FIGURE 1, I have schematically illustrated therein an extrusion system of the well known type which includes an extruder 20 which is connected to an extrusion die 21 by a conduit 22. The extrusion die 21, which will be described more fully in FIGURES 3 and 4, extrudes a flat web 23 of some suitable thermoplastic material. Web 23 is captured by the clip 24 and 25 on its opposite sides of a suitable tenter frame apparatus.

The clips 24 and 25 are connected to suitable driving mechanisms, schematically illustrated by blocks 26 and 27, respectively, whereby the clips 24 and 25 are caused to move axially in the direction of extrusion of web 23 and are caused to move outwardly with respect to one another, thereby to transversely stretch and orient the web 23.

After the web has been suitably oriented and has been suitably operated upon by the tenter frame structure, it passes through suitable cutting knives 28 and 29 which slice off the edges 30 and 31 of the film which are recycled and reused in the extruder 20.

All of the foregoing is old and well known.

The principle of the present invention is to modify the die 21 in such a manner that the web 23 will, as shown in FIGURE 2, have inflated edge beads 41 and 42 in the sides of the web, thereby to permit improved gripping of the sides by the tenter frame clips; to improve the heat transfer between the film and the tenter clips; and to provide means of improving the pressure drop across the discharge orifice of die 21 so that the pressure drop will be more uniform across the full width of the orifice. That is to say, by making the inflated beads 41 and 42 larger or smaller, their velocities and thus the edge velocity of the film may be controlled.

A typical die 21 is shown in FIGURES 3 and 4 wherein the die is provided with a connection pad 50 which has an opening 51 connected to the interior of conduit 22 of FIGURE 1.

The opening 51 then leads into a fantail section 52 within the die which leads to a channel 53 which is enclosed at either end by the end caps 54 and 55 which are suitably bolted to the die lips 56 and 57.

The channel 53 then leads to a channel 58 which in turn communicates with the exit orifice 59 through which the film is discharged.

In accordance with the present invention, the end caps 54 and 55 of the standard die are modified in such a manner as to receive a novel ball and socket edge bead-forming tube which will inject a stream of relatively low pressure air into the edges of the film being extruded, thereby to define the edge beads 41 and 42 of FIGURE 2. Clearly, however, the basic concept of the invention is to inject an air channel into the edges of an extruded flat sheet by any suitable air injection mechanism which is located in the discharge orifice of the die.

The ball and socket injection mechanism is illustrated in detail in FIGURES 5 through 17 for the case of one end of an extrusion die. Clearly, an identical arrangement will be provided for the other end of the die.

Thus, FIGURE 16 illustrates the assemblage wherein the end cap 54 of FIGURE 3 is replaced by structure in accordance with the invention for the formation of one edge bead. More particularly, FIGURE 16 shows the die lip 56 and channel 53 which communicates with the fantail 52, as in FIGURES 3 and 4. The end of the die shown in FIGURE 16 is then covered by the outer and inner die caps 70 and 71 which are shown in more detail in FIGURES 5, 6, 7 and 8.

Referring first to FIGURES 5 and 6 which show the outer die cap 70, it will be seen that the outer cap 70 is provided with a plurality of openings such as openings 72 through 77 which receive suitable bolts for bolting the plate 70 to the end of the die. Plate 70 further has an opening 78 therethrough which has a counter section 79 which ultimately receives the head 80 of the guide rod 81 of FIGURE 15. Guide rod 81 provides a support for the tenter frame and serves as an alignment guide for the tenter frame clips.

The die cap 70 has a further through-opening 82 which terminates in a surface 83 which is a section of a sphere. In addition, the right-hand surface of die cap 70 is provided with a small channel 84 which has a circular portion which surrounds and is external of spherical portion 83 and has upper and lower extending portions 84a and 84b, respectively.

Turning next to FIGURES 7 and 8, the edge bead inner cap 71 has an external surface configuration which is identical to the configuration of die 70 of FIGURES 5 and 6, and thus has bolt openings 90 through 95 which are aligned with bolt openings 72 through 77, respectively, of FIGURE 5 for the die cap or outer edge bead cap.

Note that, as best shown in FIGURE 6, the surface of the inner cap 71 adjacent opening 78 is continuous so that enlarged head 80 of guide rod 81 will be captured between the outer cap 70 and inner cap 71.

The inner cap 71 then has a spherical depression 96 in the left-hand surface thereof which mates with spherical portion 83 of outer cap 70 to define a generally spherical interior volume. As will be seen more fully hereinafter, this generally spherical volume captures the spherical head of the edge bead-forming tube of FIGURES 9 and 10.

The inner cap 71 then has a channel 97 extending therethrough which communicates with channel 53 of the die, as shown in FIGURE 16, and extends downwardly to an external surface channel 98 which surrounds spherical portion 96 and communicates with a smaller channel 99. The channel section 99 then communicates with the lower extending channel 84b of the channel section 84 below the spherical portion 83 in the outer edge bead cap of FIGURES 5 and 6.

Therefore, it can be clearly understood that when the inner and outer edge caps are assembled together in FIGURE 16, there will be a channel extending from channel 97 and surrounding the ball-shaped socket which by-passes the socket and continues outwardly as the circular channel 100, shown in FIGURE 16. That is to say, the channel 100 of FIGURE 16 is defined by channel portion 99 of FIGURE 8 in the inner cap, and the channel portion 84b in the outer cap 70.

The edge bead-forming tube is then shown in FIGURES 9 and 10 as the edge bead-forming tube 110. As shown in FIGURES 9 and 10, the edge bead-forming tube is formed of a spherical ball section 111 which has a hollow tube 112 entering through one surface of head 111.

The tube 112 then has a central passage 113 extending therethrough, and a thin tube 114 passes through another portion of head 111 and passes through the wall of conduit 112 to communicate with passage 113. The tube 114 is, therefore, in communication with passage 113 so that air connected to passage 113 under pressure will be ejected from tube 114. The tube 114 then extends through the passageway 100, shown in FIGURE 16, formed between the inner and outer caps 71 and 70, respectively, with the spherical head 111 being captured in the spherical chamber formed between the caps 70 and 71.

It is to be specifically noted that there will be a certain amount of clearance existing between the channel 100 and tube 114, and tube 112 and channel 82 through which it passes in the outer cap 70. This is to permit rotation or axial adjustment of the discharge end of tube 114 within the passageway 100.

It will be further noted that because of the arrangement shown in FIGURE 16, molten polymer flowing from the orifice 53 can flow into channel 97, and around the spherical head 96 and into channel 100. Thus, molten polymer being discharged from the die will flow around the tube 114 at the edge of the film. Therefore, air discharged from the tube 114 will be captured within the edge of the tube, thereby to form an inflated bead at the edge of the film.

Moreover, and as will be described more fully hereinafter, the discharge end of tube 114 can be accurately located at the edge of the film by relatively small rotation of the spherical head 96 within its seat between inner and outer caps 71 and 70.

In order to support the edge bead-forming tube at the edge of the die, an adjusting bolt 120, shown in FIGURES 11 and 12, is provided which has an eye 121 and threaded shaft 122.

As shown in FIGURE 16, the threaded end of tube 112 passes through the opening in eye 121 after the tube 120 is secured within opening 123 (FIGURE 15) of guide rod 81. That is, and as shown in FIGURE 16, the shaft 122 is secured to guide rod 81 by the bolts 124 and 125 which are threaded on the shaft 122 and straddle the guide rod 81.

In addition, the threaded end of tube 112 receives a spherical washer 126 which cooperates with a second spherical washer 127 with the assemblage bolted by the bolt 128 to the outer cap 70. By using spherical washers 126 and 127, it is now possible to adjust and fix the angular position of shaft 112 in the plane of the drawing or in a plane perpendicular to the drawing. Adjustment in the plane of the drawing is accomplished by moving the bolts 124 and 125 in such a direction as to shorten or lengthen the distance between the shaft 81 and the shaft 112.

Thus, the end of tube 114 can be adjusted in the plane of the paper through this adjustment.

Additional adjustment is also obtainable in the plane perpendicular to the paper through the rotation of shaft 112 into and out of the paper. Thus, the tube 114 can also be adjusted in a plane perpendicular to the paper, whereupon the end of tube 114 can be adjusted at any point within the channel 100.

A source of air is then connected to channel 113 of the edge bead-forming tube 110 in any desired manner. By way of example, a suitable air passage nut 140 can be threaded onto the end of shaft 112, as shown ing FIGURE 16, with the air passage nut 140 connected to a suitable source of compressed air 114.

The air passage nut is best shown in FIGURES 13 and 14, and has a threaded opening 142 which can be threaded onto the threaded end of shaft 112 and secured thereto as by a set-screw which enters the tapped opening 143.

A second tapped opening 144 is then placed in the nut 140 for reception of a suitable connection nipple from the air source 141. Internal passageways 145 and 146 then connect the threaded openings 144 and 142 and thus the compressed air source 141 to the central passage 113 of the edge bead-forming tube 110.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An extrusion die for extruding a flat web of thermoplastic material; said extrusion die comprising a pair of elongated opposed die lips defining a narrow discharge orifice, first and second end plate means extending across the respective opposite ends of said die lips to terminate the ends of said discharge orifice, passage means extending through said die to convey molten thermoplastic material to said discharge orifice, first and second bead forming orifices in said first and second end plates extending from said passage means to the respective opposite ends of said discharge orifice, first and second air conduits positioned within said first and second bead forming orifices, and a source of gas connected to said first and second gas conduits thereby to discharge a gas stream into the edge regions of said web extruded from said discharge orifice to form inflated beads in the side edges of said web; adjustable support means connected to said first and second end plate means and connected to said first and second gas conduits; said adjustable support means permitting adjustment of the location of the discharge end of said first and second gas conduits with respect to the side edges of the web extruded from said discharge orifice; said adjustable support means including a ball and socket connection; said first and second gas conduits having respective ball bead sections having their tubes extending therefrom and into said edges of said discharge orifice; said first and second end plate means containing generally spherically shaped cavities receiving said ball bead sections of said first and second gas conduits; rotation of said ball bead sections in said spherically shaped cavities adjusting the position of the discharge ends of said thin tubes in said discharge orifice.

2. The device substantially as set forth in claim 1 wherein said spherically shaped cavities include an annular channel surrounding their respective said ball bead sections to produce a flow path for molten thermoplastic material from said passage means and around each of said thin tubes at either end of said discharge orifice.

3. The device substantially as set forth in claim 2 wherein each of said first and second end plate means comprises an inner end cap and outer end cap; said inner end caps positioned adjacent the ends of said die lips; said inner end caps including channel means therein which are continuous with said discharge orifice defined between said die lips and a first spherical depression centrally located in said channel means; said outer end caps including a second spherical depression adjacent said first spherical depression to define said spherical cavities; said outer and end caps sealing over said channel means in said inner end caps.

References Cited by the Examiner

UNITED STATES PATENTS 3,211,816  10/1965  Brown _____ 18—12 X

WILLIAM J. STEPHENSON, *Primary Examiner.*